(12) United States Patent
Oh (10) Patent No.: US 11,254,293 B2
(45) Date of Patent: Feb. 22, 2022

(54) ONE TOUCH TYPE AUXILIARY BRAKE FOR DRIVING TRAINING

(71) Applicant: Jun Woo Oh, Goyang-si (KR)

(72) Inventor: Jun Woo Oh, Goyang-si (KR)

( * ) Notice: Subject to any disclaimer, the term of this patent is extended or adjusted under 35 U.S.C. 154(b) by 83 days.

(21) Appl. No.: 16/919,711

(22) Filed: Jul. 2, 2020

(65) Prior Publication Data
US 2021/0122338 A1 Apr. 29, 2021

(30) Foreign Application Priority Data
Oct. 25, 2019 (KR) .......................... 10-2019-0133928

(51) Int. Cl.
*B60T 7/10* (2006.01)
*B60T 17/20* (2006.01)

(52) U.S. Cl.
CPC ................ *B60T 7/10* (2013.01); *B60T 17/20* (2013.01)

(58) Field of Classification Search
CPC .. G05G 1/487; G05G 1/34; B60T 7/10; B60T 7/08; B60T 17/20
See application file for complete search history.

(56) References Cited

U.S. PATENT DOCUMENTS

| | | | | |
|---|---|---|---|---|
| 2,481,966 A * | 9/1949 | Zivi | ....................... | G05G 1/487 74/481 |
| 3,850,048 A * | 11/1974 | Moore | ..................... | B60T 7/08 74/491 |
| 5,129,492 A * | 7/1992 | Lenz | ......................... | B60T 7/08 477/27 |
| 6,435,005 B1 * | 8/2002 | Kikuchi | ............. | G01N 27/4067 29/595 |
| 7,040,447 B1 * | 5/2006 | Mawhinney | ........... | G05G 1/487 180/315 |

(Continued)

FOREIGN PATENT DOCUMENTS

| | | | | |
|---|---|---|---|---|
| DE | 19715992 C2 * | 2/2003 | ................ | B60T 7/10 |
| DE | 102020007650 A1 * | 2/2021 | ............. | G05G 1/487 |
| KR | 20-0300527 | 1/2003 | | |

(Continued)

OTHER PUBLICATIONS

Decision to Grant a Patent for Korean Application No. 10-2019-0133928 dated Feb. 4, 2020, with its English translation, 3 pages.

*Primary Examiner* — Daniel D Yabut
(74) *Attorney, Agent, or Firm* — Bret E. Field; Bozicevic, Field & Francis LLP (57) ABSTRACT

A one touch type auxiliary brake for driving training is disclosed. The auxiliary brake includes: a stick member having a handle at an end thereof and extendedly provided by a distance from a passenger seat to a brake pedal shaft of a driver's seat; and a bracket member formed in a hollow rectangular frame shape so that the brake pedal shaft is positioned therein, wherein a first plane is fixedly coupled to an opposite end of the stick member, a second plane is provided to be inwardly inclined to allow the brake pedal shaft to be slidable into the rectangular frame when the brake pedal shaft is fastened thereto, and a fourth plane adjacent to an inclined end of the second plane is coupled to an elastic hinge to be rotated outward and returned to its original position when the brake pedal shaft is fastened thereto and unfastened therefrom.

5 Claims, 6 Drawing Sheets

(56) References Cited

U.S. PATENT DOCUMENTS

| | | | | |
|---|---|---|---|---|
| 7,195,096 B1 * | 3/2007 | Mawhinney | ............ | G05G 1/487 |
| | | | | 180/315 |
| 2014/0298944 A1 * | 10/2014 | Gibbs | ..................... | B60T 7/08 |
| | | | | 74/481 |

FOREIGN PATENT DOCUMENTS

| KR | 200300527 Y1 * | 1/2003 |
|---|---|---|
| KR | 200455672 Y1 * | 9/2011 |
| KR | 20-0456611 Y1 | 11/2011 |
| KR | 20120132982 A * | 12/2012 |
| KR | 10-1244448 B1 | 3/2013 |
| KR | 20-0474053 Y1 | 8/2014 |
| KR | 200474053 Y1 * | 8/2014 |
| KR | 20140147222 A * | 12/2014 |

* cited by examiner

ONE TOUCH TYPE AUXILIARY BRAKE FOR DRIVING TRAINING

CROSS REFERENCE TO RELATED APPLICATION

The present application claims priority to Korean Patent Application No. 10-2019-0133928, filed Oct. 25, 2019, the entire contents of which is incorporated herein for all purposes by this reference.

BACKGROUND OF THE INVENTION

Field of the Invention

The disclosed content relates to an auxiliary brake for driving training, wherein the auxiliary brake enables a driving instructor, accompanying a driving trainee, to couple the auxiliary brake to a brake pedal to operate a brake instead of the driving trainee in case of an emergency.

Description of the Related Art

Unless otherwise indicated herein, the content described in this section is not conventional art for the claims of this application, and is not admitted to be the conventional art by inclusion in this section.

Beginner drivers who have just obtained a driver's license, or trainees who are training to obtain a driver's license are inexperienced in driving or in defensive driving to prevent accidents, and thus not only the safety of passengers may be affected, but also a dangerous situation may occur for the driver or pedestrians. Therefore, in this case, it is common that a driving instructor who teaches driving is in the vehicle with the trainee.

In addition, since it is difficult to actively prevent an accident by only riding together with and coaching a trainee, a professional training academy such as a driving school actually modifies a vehicle so as to install an auxiliary brake, capable of controlling the vehicle, at a position in the space of the passenger seat in addition to the driver's seat. However, at present, not all driving training academies use the vehicle equipped with such an auxiliary brake, and in particular, in the case where an ordinary individual teaches a driving trainee how to drive, it is impractical to use the auxiliary braking device.

Therefore, in practice, the driving instructor sitting in the passenger seat must pull a stick-shaped auxiliary brake directly coupled to a brake pedal shaft of a driver's seat of the vehicle, so as to prevent a car accident from occurring.

Meanwhile, in the conventional auxiliary brake means, there is inconvenience in that the brake has to be directly fastened to and unfastened from the brake pedal shaft, and there is a problem in that obstruction may occur between the brake and the user's foot that uses the brake, thereby causing a dangerous situation.

DOCUMENTS OF RELATED ART (Patent Document 1) 1. Korean Utility Model Registration No. 20-0300527 (Dec. 27, 2002)
(Patent Document 2) 2. Korean Utility Model Registration No. 20-0456611 (Nov. 3, 2011)
(Patent Document 3) 3. Korean Patent No. 10-1244448 (Mar. 11, 2013)

SUMMARY OF THE INVENTION

The objective is to provide a one touch type auxiliary brake that may be easily fastened to and unfastened from a brake pedal shaft in a one touch manner by a driving instructor, while sitting in a passenger seat, without having to directly fasten to and unfasten from the brake pedal shaft.

The disclosed content as an exemplary embodiment describes a one touch type auxiliary brake for driving training, the one touch type auxiliary brake including: a stick member having a handle at an end thereof and provided to be extended by a distance from a passenger seat of a vehicle to a brake pedal shaft of a driver's seat; and a bracket member formed in a shape of a hollow rectangular frame so that the brake pedal shaft is positioned therein, wherein a first plane of the bracket member is fixedly coupled to an opposite end of the stick member, a second plane of the bracket member is provided to be inwardly inclined to allow the brake pedal shaft to be slidable into the rectangular frame when the brake pedal shaft is fastened thereto, and a fourth plane of the bracket member adjacent to an inclined end of the second plane is coupled to an elastic hinge so as to be rotated outward and then returned to an original position at a time when the brake pedal shaft is fastened thereto and unfastened therefrom.

According to the one touch type auxiliary brake for driving training as described above, the brake pedal shaft may be fastened to or unfastened from the inside of the bracket member in the one touch manner in a state where the driving instructor sitting in the passenger seat grips a handle of a stick member, thereby having an excellent advantage of having great convenience in the use.

DETAILED DESCRIPTION OF THE INVENTION

Advantages and features of a disclosed content and methods of achieving the same will become apparent with reference to an exemplary embodiment described below in detail in conjunction with the accompanying drawings. However, the disclosed content is not limited to the exemplary embodiments disclosed below, but can be implemented in various different forms. Rather, these exemplary embodiments are provided so that this disclosure of the disclosed content will be thorough and complete, and will fully convey the concept of the disclosed content to those skilled in the art, and the disclosed content will only be defined by the appended claims. Throughout the specification, the same reference numerals refer to the same components.

In the description of the exemplary embodiments of the disclosed content, it is to be noted that, when a detailed description of a known function or configuration may unnecessarily obscure the gist of the disclosed content, the detailed description thereof will be omitted. In addition, the terms particularly defined considering functions of the disclosed content may vary according to intentions, practices, etc., of users and operators. Accordingly, the definitions of the terms will be given based on the content throughout the specification.

Figure 1:
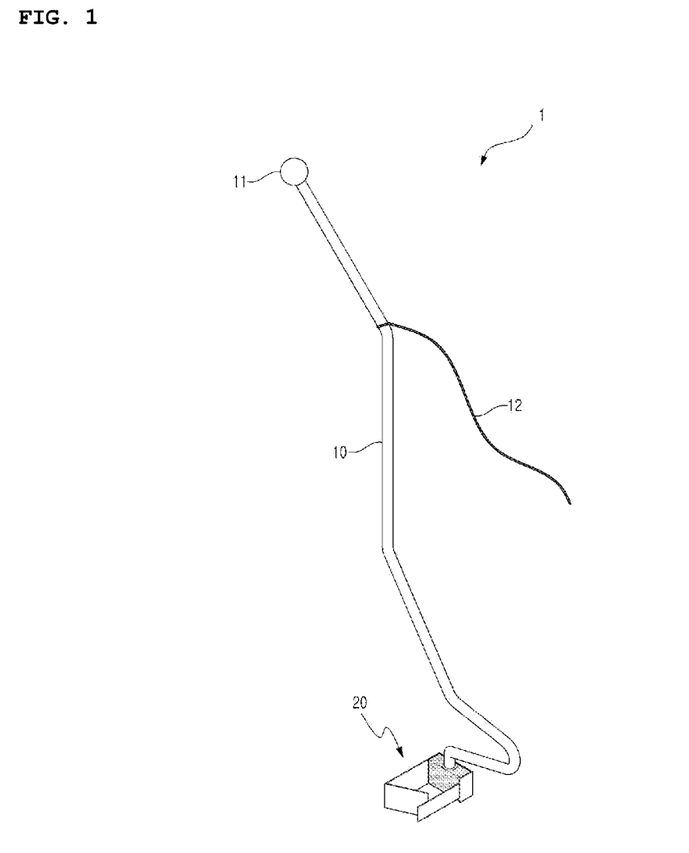
FIG. 1 is a perspective view of a one touch type auxiliary brake for driving training according to an exemplary embodiment of a disclosed content.
Figure 2:
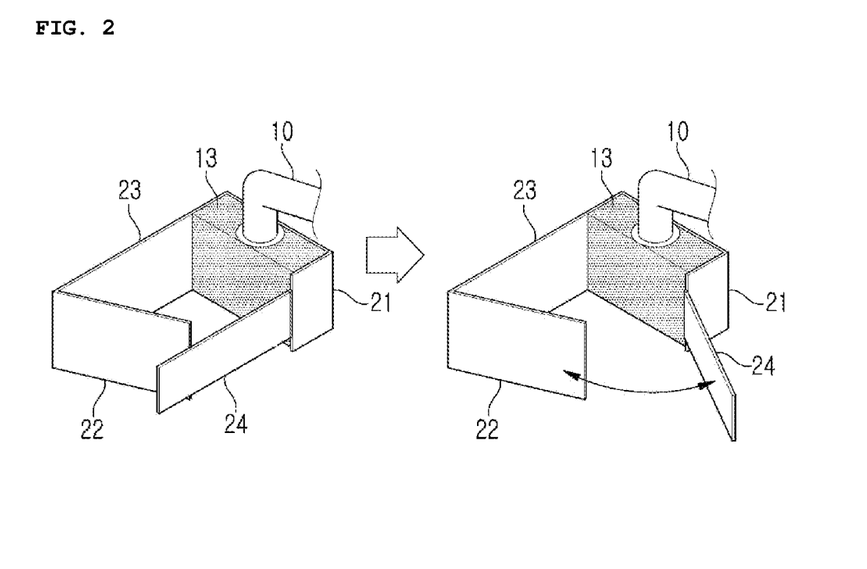
FIGS. 2 to 4 are operation diagrams of the one touch type auxiliary brake for driving training according to the exemplary embodiment of the disclosed content.
Figure 3:
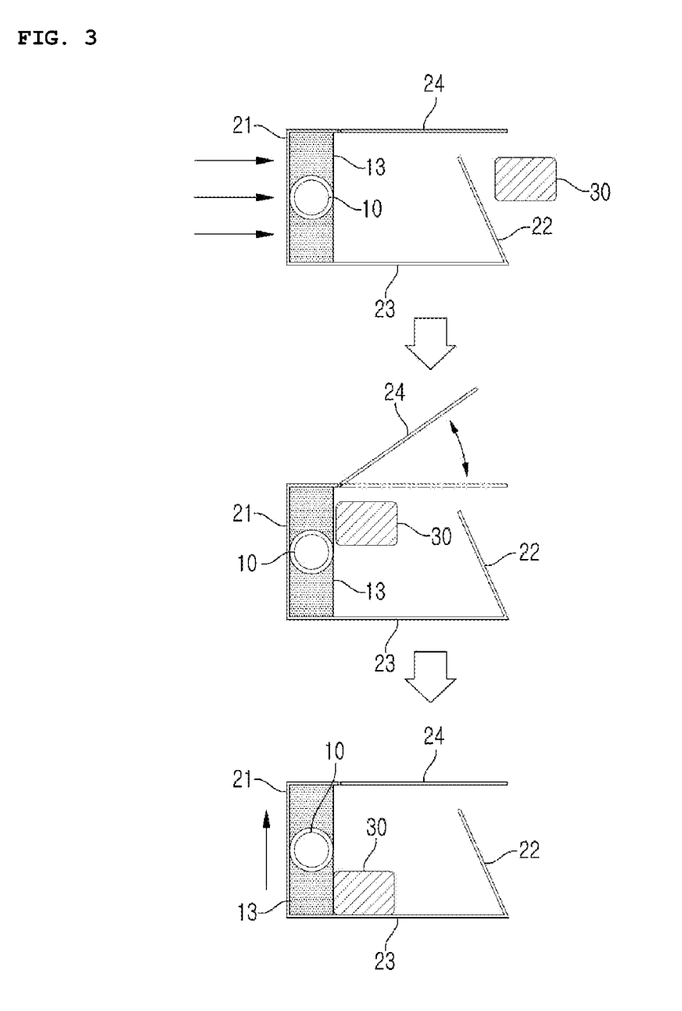
Figure 4:
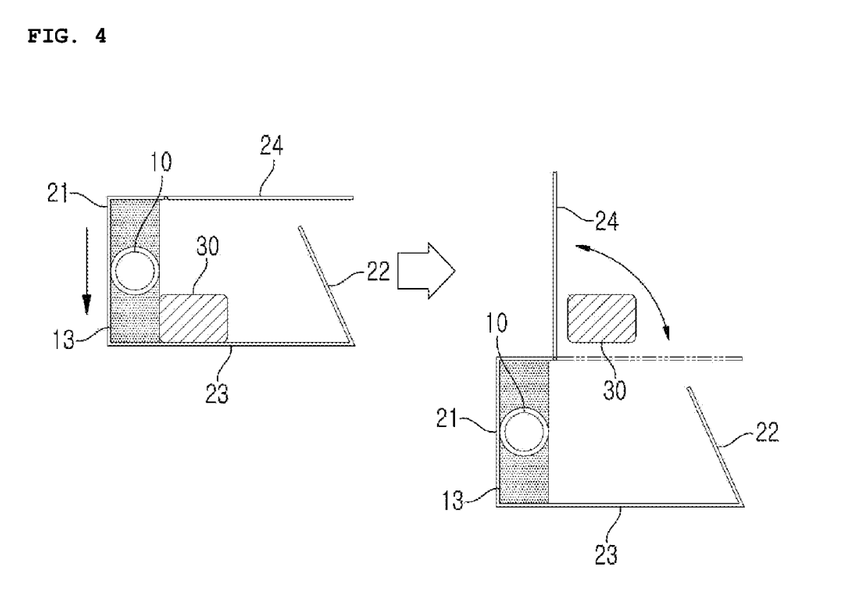
Figure 5:
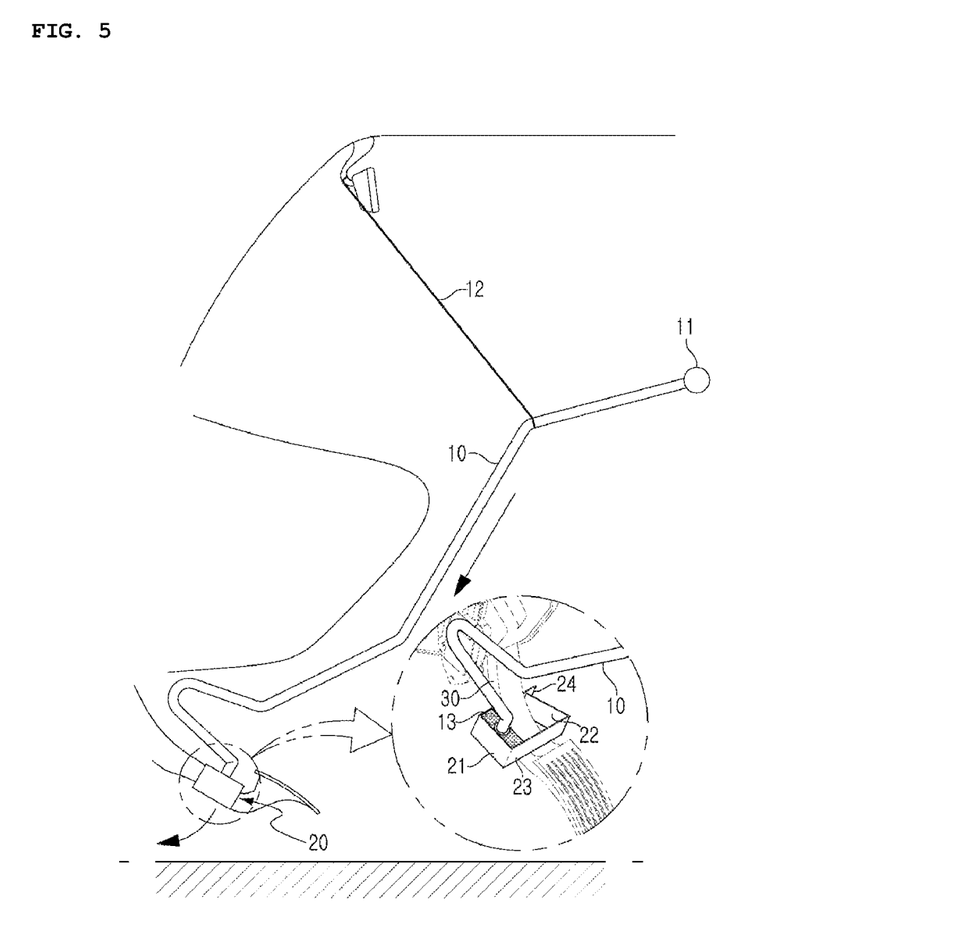
FIGS. 5 and 6 are use state diagrams of the one touch type auxiliary brake for driving training according to the exemplary embodiment of the disclosed content.
Figure 6:
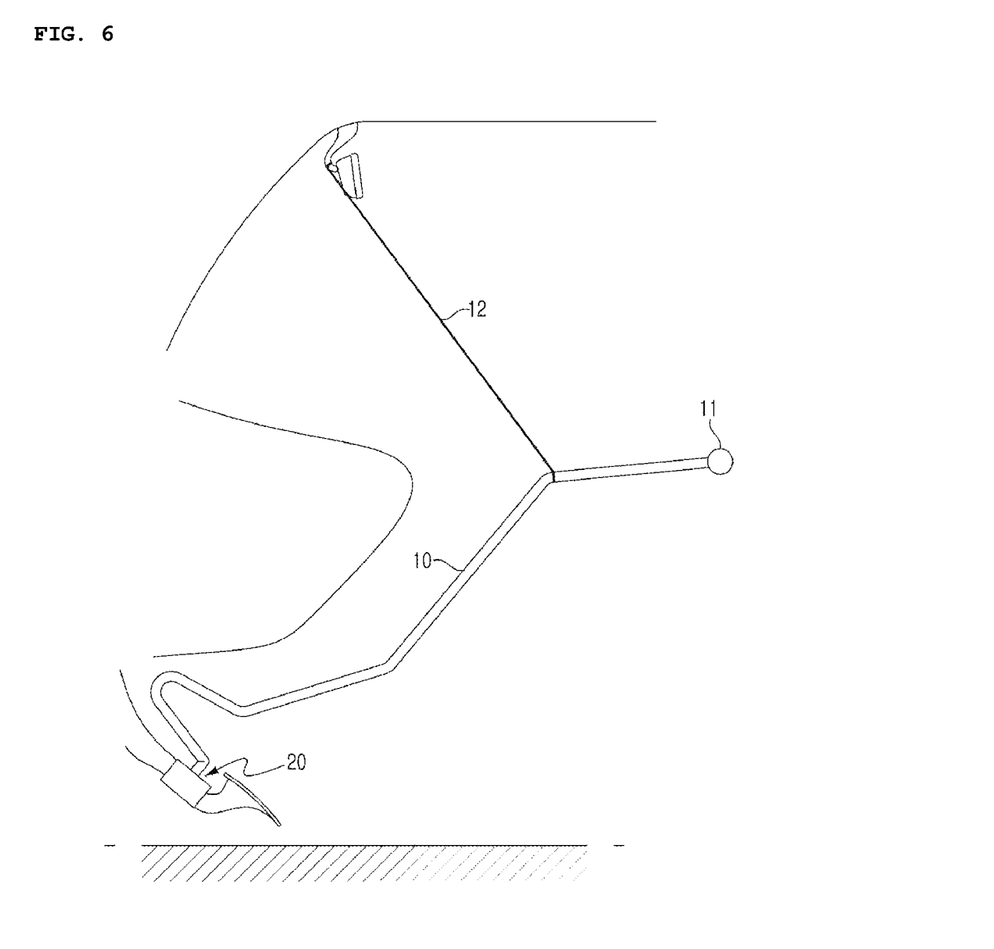

FIGS. 1 to 6 show an exemplary embodiment according to the disclosed content. FIG. 1 is a perspective view, FIGS. 2 to 4 are operation diagrams, and FIGS. 5 and 6 are use state diagrams.

Hereinafter, a one touch type auxiliary brake for driving training 1 according to the exemplary embodiment of the disclosed content will be described in detail with reference to FIGS. 1 to 4.

First, referring first to FIG. 1, a stick member 10 is provided. The stick member 10 serves to enable a driving instructor to operate a brake on the lower side of a driver's seat while sitting in a passenger seat of a vehicle. The stick member 10 is provided to be extended from the passenger seat of the vehicle to the brake pedal shaft of the driver's seat 30 by a distance, and has a handle 11 at an end thereof to be gripped by a user.

It is preferable that the other end side of the stick member 10 is provided to be bent upward, so as to allow the user's foot of the driver using the brake to be unobstructed. That is, when the stick member 10 is formed in a linear shape, the foot of the driver using the brake pedal is obstructed, and thus there is a risk that a safety accident may occur. Therefore, it is intended that the stick member 10 is bent upward to be able to avoid the foot of the driver as shown in the drawing. In addition, although not shown, the entire length of the stick member 10 may be adjusted by various methods such as a drawing in and out method and a folding method.

In addition, a side of the stick member 10 is provided with a fixing band 12 that is detachably fastened to a rearview mirror of the vehicle. This fixing band 12 serves to keep the stick member 10 in a usable position at all times without being moved in other directions. The end of the fixing band 12 may be provided with a hook to be detachably attached to the rearview mirror, or may be provided with a female velcro band and a male velcro band that are detachably attached to each other.

Next, referring to FIG. 2, a bracket member 20 is coupled and fixed to the other end of the above-described stick member 10. The bracket member 20 serves to enable the brake pedal shaft to be fastened to or unfastened from the inside of the bracket member, thereby controlling the brake pedal through the stick member 10.

Such a bracket member 20 is formed in a shape of a hollow rectangular frame so that the brake pedal shaft 30 may be positioned therein, wherein a first plane of the bracket member is fixedly coupled to an opposite end of the stick member 10, a second plane of the bracket member is provided to be inwardly inclined to allow the brake pedal shaft to be slidable into the rectangular frame when the brake pedal shaft is fastened thereto, and a fourth plane of the bracket member adjacent to an inclined end of the second plane is coupled to an elastic hinge so as to be rotated outward and then returned to an original position at a time when the brake pedal shaft 30 is fastened thereto and unfastened therefrom.

More particularly, the bracket member 20 described above includes: a first plane 21 to which the stick member 10 is fixed; a second plane 22 disposed to face the first plane 21 and formed to be inclined inward; a third plane 23 provided with opposite ends thereof to which the first plane 21 and the second plane 22 are respectively coupled; and a fourth plane 24 having one end thereof coupled to the first plane 21, having the other end thereof provided to be extended in the direction of the inclined end of the second plane 22, but provided with an elastic hinge to be elastically rotated outward. In addition, a magnetic body 13 is provided inside the first plane 21 to fix the brake pedal shaft 30 by magnetic force.

That is, referring to FIG. 3, in a state where the second plane 22 and the brake pedal shaft 30 come into contact with each other, when the driving instructor holds the handle 11 of the stick member 10 and applies force to a direction of the brake pedal shaft 30, the brake pedal shaft 30 is allowed to slide along on the slope of the second plane 22. The sliding brake pedal shaft 30 becomes in contact with the end of the fourth plane 24 at the inclined end of the second plane 22, and the fourth plane 24 is rotated outward by the applied force, and at the same time, the brake pedal shaft 30 is fastened to the inner side of the bracket member 20. At this time, it is preferable that the end of the fourth plane 24 is provided to be extended longer than the inclined end of the second plane 22 to be able to rotate in contact with the sliding brake pedal shaft 30.

Next, referring to FIG. 4, when the driving instructor holds the handle 11 of the stick member 10 and applies force to the direction opposite from a direction at the time when the brake pedal shaft 30 is fastened to, the fourth plane 24 is rotated, and at the same time, the brake pedal shaft 30 may be easily unfastened from within the bracket member 20.

Hereinafter, an entire method of using the one touch type auxiliary brake for driving training 1 according to the exemplary embodiment of the disclosed content will be described in detail with reference to FIGS. 5 and 6.

First, referring to FIG. 5, in a state where the second plane 22 and the brake pedal shaft 30 come into contact with each other, when the driving instructor holds the handle 11 of the stick member 10 and applies force to the direction of the brake pedal shaft 30, the brake pedal shaft 30 is allowed to slide along on the slope of the second plane 22. The sliding brake pedal shaft 30 becomes in contact with the end of the fourth plane 24 at the inclined end of the second plane 22, and the fourth plane 24 is rotated outward by the applied force, and at the same time, the brake pedal shaft 30 is fastened to the inner side of the bracket member 20. At this time, the brake pedal shaft 30 is mutually fastened to the magnetic body 13 by the magnetic force thereof, so as not to be moved within the bracket member 20 arbitrarily.

In this state, when a brake pedal is required to be used, the driving instructor presses the handle 11 downward, and the brake pedal shaft 30 is operated while being supported by the third plane 23, and thus the vehicle may be stopped.

Next, referring to FIG. 6, when the driving instructor holds the handle 11 of the stick member 10 and applies the force to the direction opposite from the direction at the time when the brake pedal shaft 30 is fastened thereto, the fourth plane 24 is rotated, and at the same time, the brake pedal shaft 30 may be easily unfastened from within the bracket member 20.

According to the one touch type auxiliary brake for driving training as described above, the brake pedal shaft may be fastened to or unfastened from the inside of the bracket member in the one touch manner in a state where the driving instructor sitting in the passenger seat grips a handle of a stick member, thereby having great convenience in the use.

The disclosed content is only an example, and without departing from the gist of the claims claimed in the claims, various modifications may be made by those skilled in the art, so the scope of protection of the disclosed content is not limited to the specific exemplary embodiment described above in detail.

What is claimed is:

1. A one touch type auxiliary brake for driving training, the one touch type auxiliary brake comprising:
   a stick member having a handle at an end thereof and provided to be extended by a distance from a passenger seat of a vehicle to a brake pedal shaft of a driver's seat; and
   a bracket member formed in a shape of a hollow rectangular frame so that the brake pedal shaft is positioned therein,
   wherein
   a first plane of the bracket member is fixedly coupled to an opposite end of the stick member,
   a second plane of the bracket member is provided to be inwardly inclined to allow the brake pedal shaft to be slidable into the rectangular frame when the brake pedal shaft is fastened thereto, and
   a fourth plane of the bracket member adjacent to an inclined end of the second plane is coupled to an elastic hinge so as to be rotated outward and then returned to an original position at a time when the brake pedal shaft is fastened thereto and unfastened therefrom.

2. The one touch type auxiliary brake of claim 1, wherein a side of the opposite end of the stick member is provided to be bent upward, so as to allow a foot of a driver using the brake to be unobstructed.

3. The one touch type auxiliary brake of claim 1, wherein a side of the stick member is provided with a fixing band detachably fixed to a vehicle rearview mirror.

4. The one touch type auxiliary brake of claim 1, wherein the bracket member includes:
   the first plane to which the stick member is fixed;
   the second plane disposed to face the first plane and provided to be inclined inward;
   a third plane having opposite ends thereof to which the first plane and the second plane are respectively coupled; and
   the fourth plane having an end thereof coupled to the first plane, and having an opposite end thereof provided to be extended in a direction of the inclined end of the second plane, but provided with the elastic hinge to be elastically rotated outward.

5. The one touch type auxiliary brake of claim 4, wherein a magnetic body is provided inside the first plane to fix the brake pedal shaft by magnetic force.

* * * * *